United States Patent
Wang et al.

(10) Patent No.: US 10,075,329 B2
(45) Date of Patent: Sep. 11, 2018

(54) CUSTOMIZABLE HIGH AVAILABILITY SWITCHOVER CONTROL OF APPLICATION DELIVERY CONTROLLERS

(71) Applicant: A10 Networks, Incorporated, San Jose, CA (US)

(72) Inventors: Miao Wang, Fremont, CA (US); Xin Wang, Cupertino, CA (US)

(73) Assignee: A 10 Networks, Incorporated, San Jose, CA (US)

( * ) Notice: Subject to any disclaimer, the term of this patent is extended or adjusted under 35 U.S.C. 154(b) by 845 days.

(21) Appl. No.: 14/314,686

(22) Filed: Jun. 25, 2014

(65) Prior Publication Data

US 2015/0381407 A1 Dec. 31, 2015

(51) Int. Cl.
*H04L 12/24* (2006.01)
*H04L 12/26* (2006.01)
*H04L 12/713* (2013.01)
*H04L 29/06* (2006.01)
*H04L 12/703* (2013.01)

(52) U.S. Cl.
CPC ...... *H04L 41/0663* (2013.01); *H04L 41/0668* (2013.01); *H04L 43/0817* (2013.01); *H04L 41/5096* (2013.01); *H04L 43/0823* (2013.01); *H04L 43/0876* (2013.01); *H04L 45/28* (2013.01); *H04L 45/586* (2013.01); *H04L 63/0272* (2013.01)

(58) Field of Classification Search
CPC ............ H04L 41/0654; H04L 41/0663; H04L 63/0272; H04L 63/1458
USPC .......................... 709/225, 226; 370/221, 389
See application file for complete search history.

(56) References Cited

U.S. PATENT DOCUMENTS

| | | | | |
|---|---|---|---|---|
| 7,197,661 B1 * | 3/2007 | Reynolds | ............ | G06F 11/2097 714/4.4 |
| 7,711,121 B2 * | 5/2010 | Hunt | ...................... | H04L 41/042 380/282 |
| 8,621,556 B1 * | 12/2013 | Bharali | ............... | H04L 61/1511 726/1 |
| 8,855,012 B1 * | 10/2014 | Suri | ..................... | H04L 12/2856 370/254 |
| 9,294,503 B2 * | 3/2016 | Thompson | .......... | H04L 63/1416 |
| 2007/0180168 A1 * | 8/2007 | Chikusa | ................ | G06F 3/0617 710/74 |

(Continued)

*Primary Examiner* — Ranodhi Serrao
*Assistant Examiner* — James Fiorillo (57) ABSTRACT

System and method of determining active/standby statuses of an intermediary device with respect to a logic group based on a user defined switchover policy. A user is allowed to configure a template to determine respective health levels for multiple sets of delivery resources. Each set of resources associated with a function engine residing in a respective intermediary device. The multiple sets of resources, in conjunction with the associated function engines, are equivalently operable to provide the same service function. The template may include user-specified events and respective weight factors. The specified events are monitored and a health score is dynamically derived for each delivery resource based on the template. Based on an updated health score rank with respect to the service function, a switchover may automatically occur from an intermediary device of a lower health score to another device with a higher health score.

16 Claims, 7 Drawing Sheets

(56) References Cited

U.S. PATENT DOCUMENTS

| | | | |
|---|---|---|---|
| 2008/0151916 A1* | 6/2008 | Jetcheva | H04L 45/124 370/401 |
| 2009/0138592 A1* | 5/2009 | Overcash | H04L 63/1425 709/224 |
| 2010/0115327 A1* | 5/2010 | Lee | G06F 9/5083 714/4.4 |
| 2011/0222535 A1* | 9/2011 | Suganthi | H04L 63/0272 370/389 |
| 2012/0182864 A1* | 7/2012 | Heinz | H04L 12/5695 370/221 |
| 2013/0013654 A1* | 1/2013 | Lacapra | G06F 17/30206 707/822 |
| 2013/0232252 A1* | 9/2013 | Huang | G06F 9/45558 709/224 |
| 2013/0311428 A1* | 11/2013 | Patel | G06F 17/30312 707/634 |
| 2014/0047116 A1* | 2/2014 | Dain | G06F 9/5061 709/226 |
| 2014/0078889 A1* | 3/2014 | Diab | H04L 67/327 370/221 |
| 2014/0258536 A1* | 9/2014 | Chiong | H04L 47/125 709/226 |
| 2014/0269269 A1* | 9/2014 | Kovvali | H04W 24/08 370/229 |
| 2014/0297844 A1* | 10/2014 | Kancherla | H04L 43/0894 709/224 |
| 2015/0207724 A1* | 7/2015 | Choudhury | H04L 41/12 370/255 |
| 2016/0080483 A1* | 3/2016 | Li | H04L 12/6418 709/226 |
| 2016/0352623 A1* | 12/2016 | Jayabalan | H04L 45/28 |
| 2017/0279829 A1* | 9/2017 | Vasseur | H04L 41/0893 |

* cited by examiner

┌─ 151
Receive user configuration to compile a switchover template with respect to resources managed by a logic group that resides in a cluster of ADCs ┌─ 152
Monitoring switchover events specified in the switchover template ┌─ 153
Dynamically generate a health score for each ADC with respect to the logic group based on the template ┌─ 154
Set active/standby status for each ADC with respect to the logic group by comparing the health scores

CUSTOMIZABLE HIGH AVAILABILITY SWITCHOVER CONTROL OF APPLICATION DELIVERY CONTROLLERS

TECHNICAL FIELD

The present disclosure relates generally to the field of communication networks and severs, and, more specifically, to the field of redundancy management in communication networks and servers.

BACKGROUND

A business entity that provides Internet services (e.g., a search engine, a data center, etc.) through a server-client network usually deploys intermediary devices between the servers and client devices to manage and control the network traffic to enhance the client-user experience. These intermediary devices may be an application delivery controller, a wide area network optimizer controller, a gateway, a service control engine, etc., or any other application optimization tools. Such an intermediary devices may be configured to perform a wide range of functionalities for purposes of application optimization and acceleration, such as load balancing (e.g., for layer 2, layer 4, or layer 7 services), caching, quality of service (QoS) processes, traffic steering, security protection, content transformation, health monitoring, protocol interfacing, etc.

To ensure network service reliability, a cluster of functionally equivalent intermediary devices can be connected and configured to provide failover capabilities by virtue of redundancy. With respect to a service optimization function and/or a service user group, one device (e.g., computer system) in a cluster is set to an active mode at a time and operates to perform the function while others remain in a hot standby mode. In the scenarios that the active device experiences a situation making it inefficient or impossible to perform the function to respond to client requests, one of the standby devices can automatically take over to maintain an uninterrupted operation to serve the client request.

Conventionally, the failover of an intermediary device cluster is determined by a priority rank. For example, a standby device with the highest priority becomes the next active device in case of a failover. The priority rank can change dynamically based on a health check of a few failover events defined for corresponding resources associated with the devices.

However administrators have only limited ability to configure such a failover control process. The detected failover events are treated indiscriminatorily without taking into account the personalities of the corresponding delivery service provided, or user policies. Thus, an active device and the associated resources that are selected according to the priority rank may not be the most efficient device to deliver the service.

SUMMARY OF THE INVENTION

Therefore, it would be advantageous to provide a mechanism for ranking device health for failover or switchover that can efficiently utilize network resources to effectively deliver the network service or functions.

Embodiments of the present disclosure employ a method of determining active/standby statuses maintained by an application delivery intermediary device with respect to a logic group of the devices based on a user-defined switchover policy. Within the embodiments, a user is allowed to customize a template to determine respective health levels for multiple sets of delivery resources of the logical groups of devices. Each set of resources associated with a function engine residing in an intermediary device, the function engine corresponding to a logic group. The multiple sets of resources, in conjunction with the associated function engines, are equivalently configured to provide a service function (e.g., to clients). The template is generated by incorporating user-specified events (e.g., related to resource failures and/or usages) and respective weight factors. The specified events are monitored and a health score is dynamically derived for each set of resources based on the template. Based on an updated health score rank with respect to the function engine, a switchover may automatically occur from a device of a lower health score to another device with a higher health score. Moreover, in the scenario that all the health scores are equal, a priority template can be effectuated to determine an active resource for the function.

By using a user-defined switchover determination, a user or user group can exercise granular control over the health ranking and thereby make efficient use of the network resources. Thus the switchover mechanism is well suited to particular user or user group's business needs and objectives.

In one embodiment of the present disclosure, a computer implemented method for determining active/standby status for device resources comprises: (1) receiving user input identifying a first set of events and a policy related to said first set of events for computing a health score for a first resource associated with a first device, wherein a second resource of equivalent function is attached to a second device; (2) monitoring events with respect to said first device to determine if any of said first set of events occurs; (3) based on said monitoring, and said user input, determining a health score for said first resource; (4) based on said health score for said first resource, and a health score for a second resource, determining a status of said first resource as being one of either active or standby; and (5) routing service requests to either said first resource of said first device or said second resource of said second device based on said status. The first device and said second device may be application delivery controllers and/or carrier gateway networking gateways. The first set of events includes failover events and resource usage events. The policy may include: a health value for each event of said first set of events; and a weight value for each event of said first set of events, and further comprising compiling said user input into a template and wherein said determining a health score comprises: based on said monitoring, and said template, determining a health score for said first resource. The user input may comprise a script.

The method may further comprise: (1) receiving user input identifying a second set of events and a policy related to said second set of events for computing a health score for said second resource attached to said second device; (2) monitoring events within said second device to determine if any of said second set of event occurs; and (3) based on said monitoring, and said user input, determining said health score for said second resource.

In another embodiment of the present disclosure, a non-transitory computer-readable storage medium embodying instructions that, when executed by a processing device, cause the processing device to perform a method of facilitating application delivery, said method comprising: (1) receiving user input that identifies a first set of events and a policy to said first set of events for computing health scores for a first group of resources associated with a first device, wherein said first device is communicably coupled to a second device that is associated with a second group of resources, wherein said second group have equivalent logic with said first group; (2) monitoring said first set of events with respect to said first device to determine if any of said first set of events occurs; (3) determining a health score for said first group of resources based on said monitoring said first set of events; accessing a priority rank that is determined based on a second set of events; (3) monitoring said second set of events; (4) determining a priority value for said first group of resources based on said monitoring said second set of events; and (5) determining a status of said first group of resources as being either active or standby based on said health score and said priority value; and (6) routing service requests to either said first group of resources or said second group of resources based on said status.

In another embodiment of the present disclosure, an application delivery intermediary device comprising: communication circuits; a processor; and memory coupled to said processor and comprising instructions that, when executed by said processor, cause the system to perform a method of facilitating application delivery between client devices and server devices with high reliability, said method comprising: (1) receiving user input identifying a first set of events and a policy related to said first set of events for computing a health score for a first resource attached to a first device, wherein a second resource of equivalent function is attached to a second device; (2) monitoring events with respect to said first device to determine if any of said first set of events occurs; (3) based on said monitoring, and said user input, determining a health score for said first resource; (4) based on said health score for said first resource, and a health score for said second resource, determining a status of said first resource as being one of either active or standby; and (5) routing service requests to either said first resource of said first device or said second resource of said second device based on said status.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several

Customizable High Availability Switchover Control of Application Delivery Controllers Overall, provided herein are systems and methods of determining active/standby statuses of an application delivery intermediary device with respect to a function engine in a logic group based on a user-defined switchover policy. In some embodiments, A user is allowed to configure a template (e.g., through a graphical user interface or a script) to determine respective health levels for multiple sets of delivery resources. Each set of resources is associated with a function engine residing in a respective intermediary device. The multiple sets of resources, in conjunction with the associated function engines, are configured to provide the same delivery function. The template may include user-specified events related to resource failures and/or usages and respective weight factors. The specified events are monitored and a health score is dynamically derived for each delivery resource based on the template. Based on an updated health score rank with respect to the service function, a switchover may automatically occur from a device of a lower health score to another device with a higher health score.

Figure 1A:
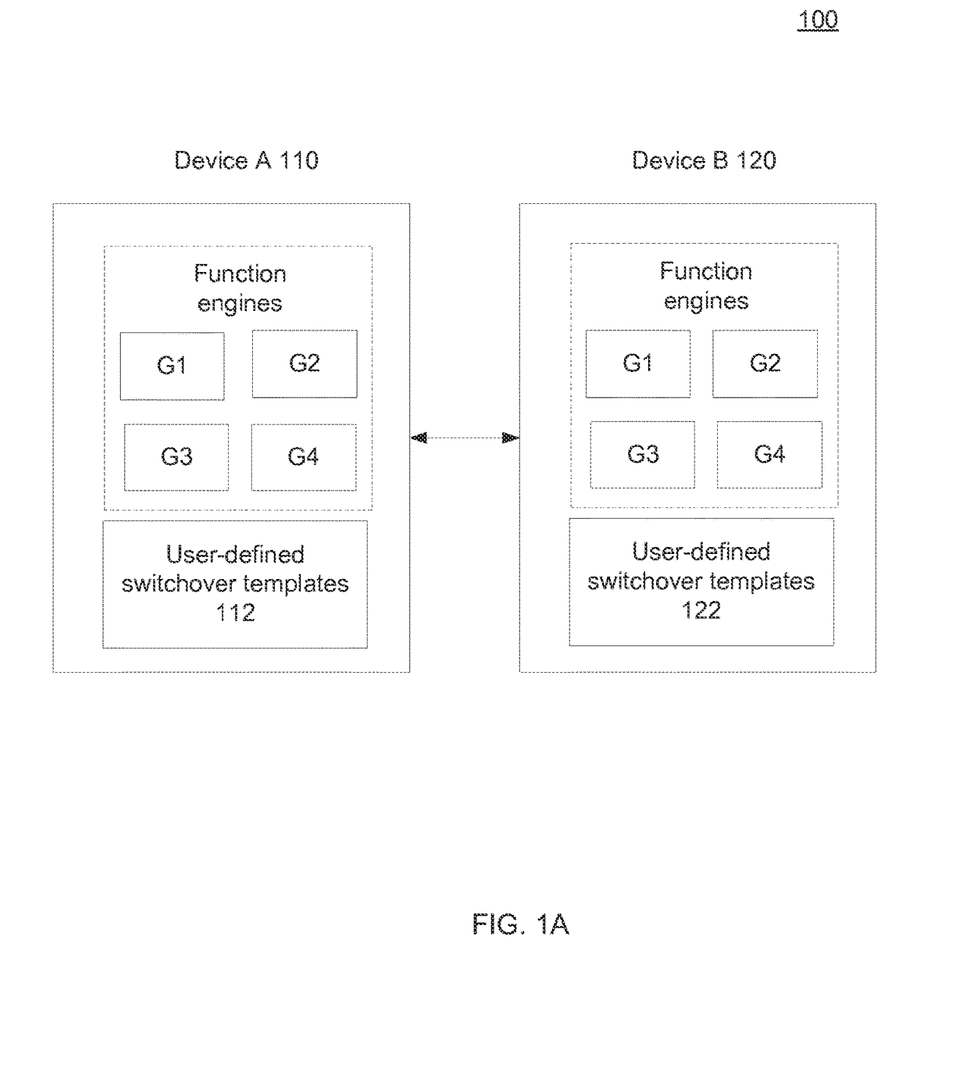
FIG. 1A illustrates a cluster of application delivery intermediary devices that employ user-defined templates to control the switchover in accordance with an embodiment of the present disclosure.

FIG. 1A illustrates a cluster of application delivery intermediary devices 100 that employ user-defined templates to control the switchover in accordance with an embodiment of the present disclosure. The cluster includes a device A and a device B communicatively coupled to each other. The two devices have the same four functions engines G1-G4. With respect to each function engine, one device serves as an active device and the other one serves as a standby device. Switchover between the two devices is determined based on a user-defined template residing in both devices (112 and 122).

Hereunder, an application delivery intermediary device may be an application delivery controller, a gateway, a service control engine, and alike. A cluster of devices serving the same logic groups are communicably coupled together to achieve high availability and high efficiency by virtue of failover, or switchover.

A function engine resides in an intermediary device and manages a set of resources (e.g., associated infrastructures) pertinent to a type of delivery service and/or service group. A logic group, implemented as corresponding function engines in the cluster of devices, is configured for a certain type of delivery service, such as server load balancing (for network layer 2, layer 4 and layer 7), link load balancing and global server load balancing (GSLB), application scripting, custom routing, TCP offload and connection multiplexing, SSL offload and acceleration, caching and compression, quality of service (QoS) and traffic shaping, or web application security. With respect to a delivery service, different logic groups may be configured for different delivery services or for the same delivery service to different user groups.

Figure 1B:
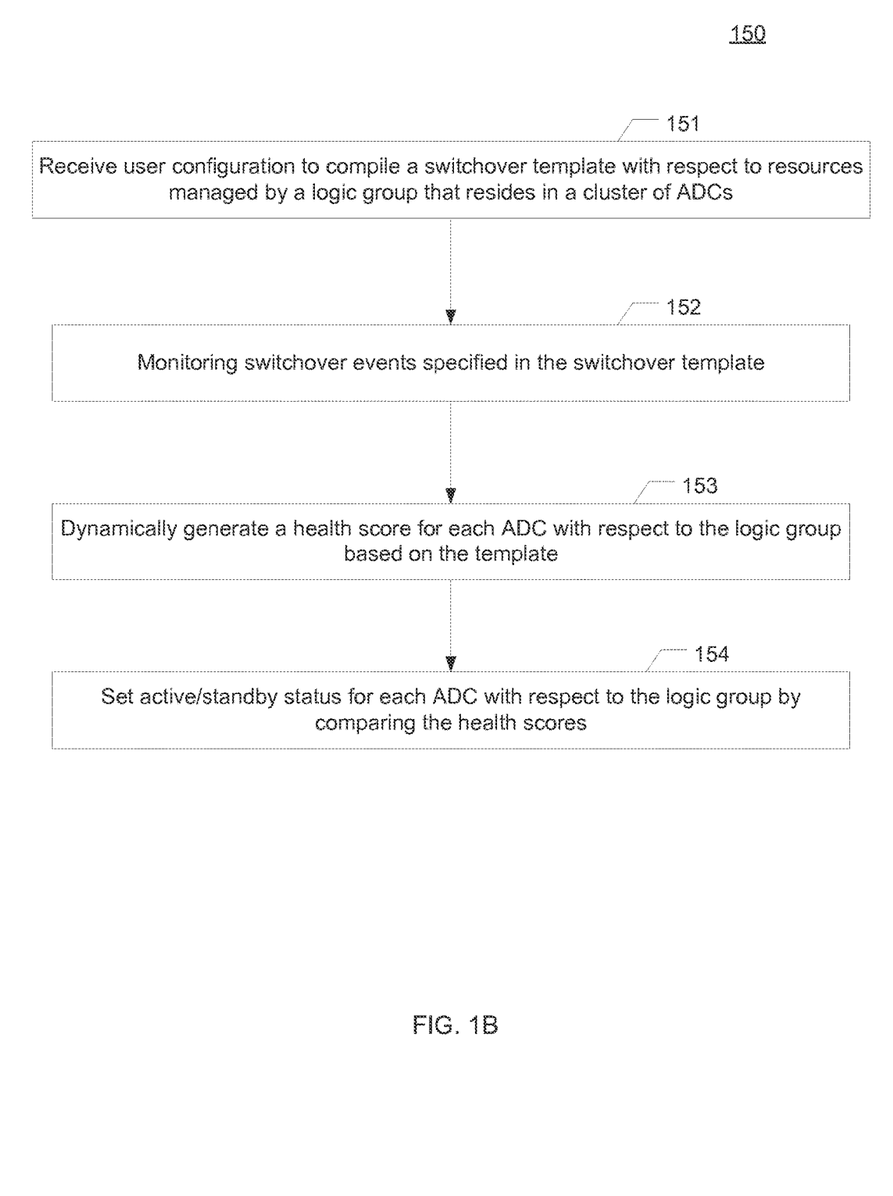
FIG. 1B is a flow chart depicting an exemplary computer controlled method of determining active/standby statuses for a cluster of application delivery devices (ADCs) with respect to a logic group based on customized switchover templates in accordance with an embodiment of the present disclosure.

FIG. 1B is a flow chart depicting an exemplary method 150 of determining active/standby statuses for a cluster of application delivery devices (ADCs) with respect to a logic group based on a customized switchover template in accordance with an embodiment of the present disclosure. Method 150 may be implemented as (e.g., configured for load balancing) of a software program run on each ADC. The function engine of the logic group in each ADC is configured to manage a set of resources to perform the same delivery service. In some embodiments, each set of resources is associated with a unique virtual router identifier (VRID).

At 151, user configurations are received and compiled into a switchover template for the logic group. The user configurations include a set of events related to resource failures and usages and a policy on the set of events. Based on a customized policy, the user can assign respective weight factors to the set of events and further define a mathematic relationship of the events to derive a health score. Therefore the health score effectively indicates the capability and efficiency of a specific set of resources to provide the service based on the user defined policy.

Since the users are afforded with the flexibility to define different switchover policies for different services or service-user groups, the services and service-use groups can advantageously perform on their own personality. For example, for a logic group managing a centralized gateway service (CGS), events related to gateway resources can be assigned with high weight factors; whereas, the events pertinent to the virtual local area network (VLAN) resources can be assigned with low weight factors or excluded from the template. By contrast, for a logic group managing a service request block (SRB) service, events like port up or down are critical and thereby assigned with high weigh factors.

The user configuration input can be received through any suitable manner, e.g., a command line, a compiled script or through a graphical user interface (GUI). For example, a user can select the set of events from a pool of eligible events presented on the GUI. The user can also select one from a collection of pre-defined templates and optionally modifies it. The respective weight factors can be assigned by users or modified by users based on preset values.

It will be appreciated that any suitable event can be incorporated in the customized template in order to select an ADC to provide the corresponding delivery optimization function. The set of events may be pertinent to usage and/or errors of associated resources. The resources may be selected from memory, a virtual local area network (VLAN), an Ethernet data port, a firewall failure, a trunk, a link, a buffer, a router, a firewall, and a processing unit. For example, the set of events may be selected from a gateway disconnection, memory usage reaching a predetermined threshold, a virtual local area network (VLAN) traffic stop, an Ethernet data port failure, a firewall failure, a trunk failure, a link failure, a buffer location failure, and a selected route being unavailable in an associated data route table, etc.

The selected events may be entered in a monitor queue following user configuration. At 152, the respective resources associated with each ADC are monitored for the set of events defined in the switchover template.

At 153, a health score is dynamically derived for each function engine of the logic group in the respective ADC using the customized switchover template. The present disclosure is not limited to any specific formula to compute a health score based on the user selected events. For instance, a health score may be equal to subtraction of a weighted aggregation of the detected events from a predetermined ceiling value. The weighted aggregation may be linear or non-linear.

A health score for an ADC may be updated periodically, or following any occurrence of the set of events. Each ADC can communicate the health scores to its peer device, e.g., by use of a heartbeat message. At 154, the ADC with the highest health score is set to the active mode to manage the service as defined by the logic group. At the same time, the rest of the ADCs in the cluster are set to a standby mode. In effect, if the currently active ADC no longer tops the health rank, switchover to the ADC with the highest score occurs. Thereby the delivery service is provided in high efficiency as well as high availability and reliability.

In some embodiments, a switchover may be executed immediately following a health rank change of the currently active ADC. In some other embodiments, a grace time period is imposed before a switchover to prevent a ping-pong effect. Further, in some embodiments, a minimum health score disparity is required to trigger a failover from the instant active device to the device with the top score. For example, if the health score for the instant active device is 199 while the highest score of the cluster is 200, a failover may not occur immediately if a user defines a minimum disparity to be 10.

The foregoing 152-154 are repeated in a rate which may be configurable by a user.

The present disclosure can be combined with any other failover method that is well known in the art. In some embodiments, the switchover control can be implemented as a two-tier determination scheme by using primarily a health rank determined by a customized template and a priority rank supplementary thereto. For example, only when the health scores of the ADCs are all equal, a priority rank can be determined for the switchover.

Regarding to the priority rank, users can configure some events (e.g., interface down) that are considered to be critical for a logic group, for example that is associated with a unique identifier (VRID), and assign priority value to the event. When an event occurs, the priority value assigned thereto will be deducted from the priority configured, e.g., 1-255 for a VRID of a given device. It will be appreciated that there can be overlaps of tracked events in both tiers.

Figure 2:
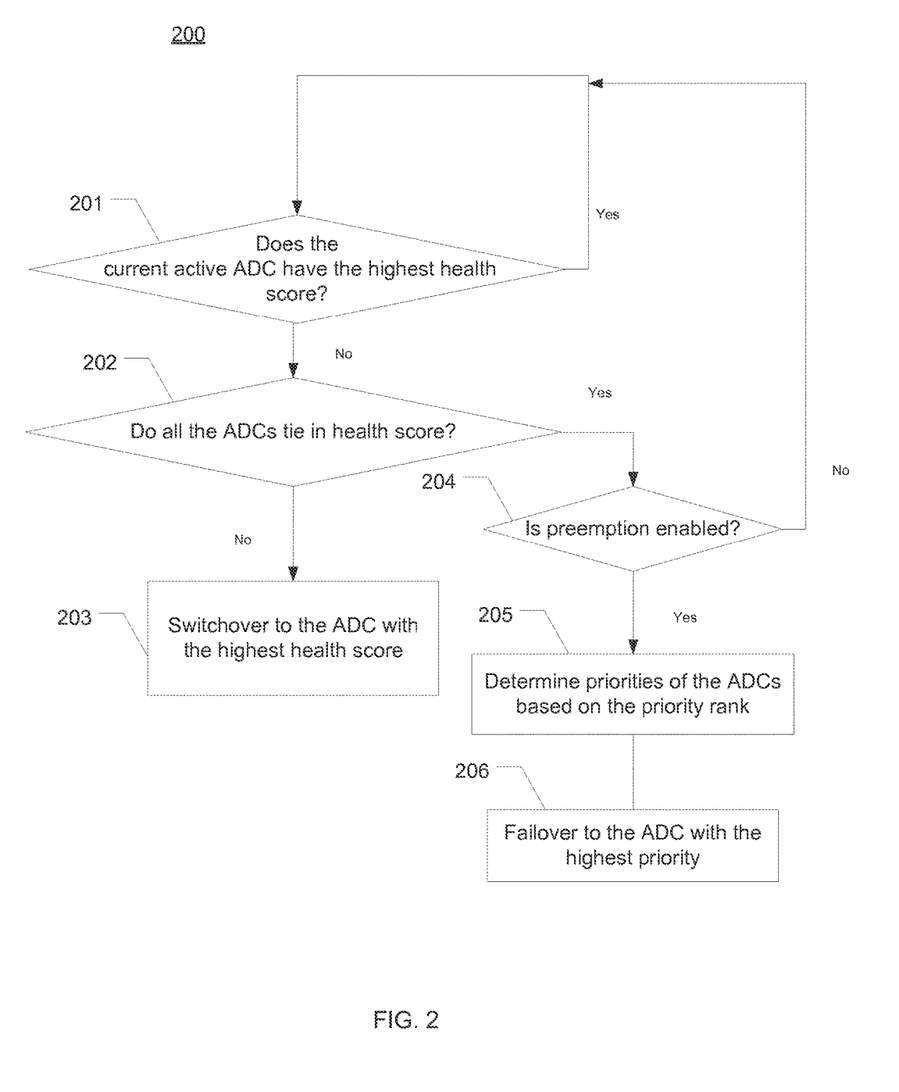
FIG. 2 is a flow chart depicting an exemplary computer implemented method of determining a switchover by using a two-tier scheme to determine a switchover device with respect to a logic group in accordance with an embodiment of the present disclosure.

FIG. 2 is a flow chart depicting an exemplary method 200 of determining a switchover by using a two-tier scheme to determine a switchover device with respect to a logic group in accordance with an embodiment of the present disclosure. At 201, it is determined whether the current active ADC has the highest health score with respect to a particular logic group, e.g., by using a template as described in FIG. 1. If yes, the ADCs in the cluster remain in their respective active/standby statues. However, if the instant active ADC does not have a top health score and if health scores are unequal among the cluster as determined at 202, a switchover to the ADC with the highest health score occurs at 203.

However if all the ADCs tie in health score as determined in 202, it is checked if the preemption is enabled at 204. If the preemption is disabled, then the priority template is disabled and no switchover occurs. If preempted, the priority template is effectuated at 205 to determine an updated priority rank on the occurrences of events addressed therein. Then a switchover to the ADC with the highest priority occurs at 206.

Figure 3:
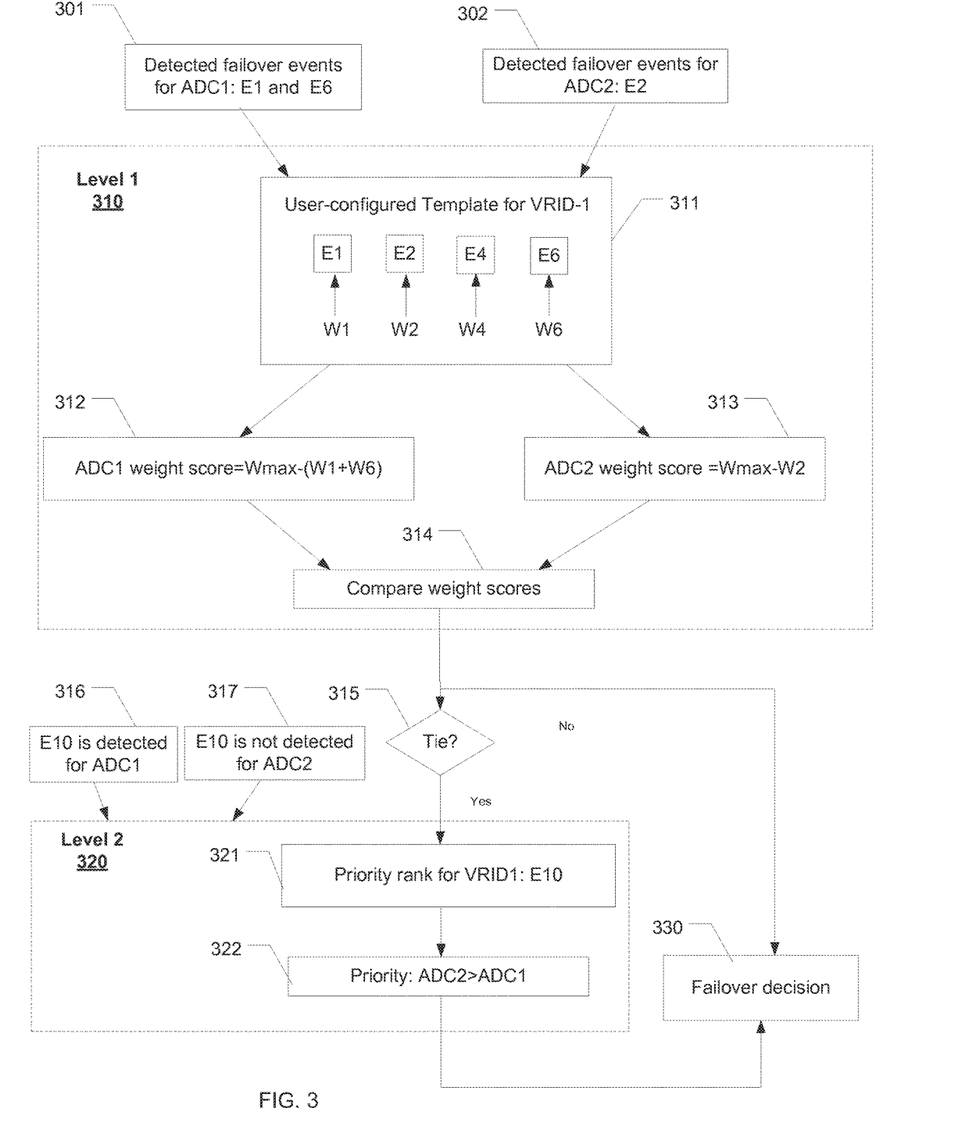
FIG. 3 illustrates an exemplary process of generating a switchover decision using a two-level decision-making process in accordance with an embodiment of the present disclosure.

FIG. 3 illustrates an exemplary process 300 of generating a switchover decision using a two-level decision-making process in accordance with an embodiment of the present disclosure. Level 1 310 is the primary level and utilizes a customized template 311 defined by user policy. Level 2 320 is a secondary level and utilizes a priority template.

In this example, two ADCs, ADC1 and ADC2, form a platform to provide a service defined by a logic group with redundancy. The first level template 311 is configured for the logic group identified as VRID-1. In the template, there are four user-specified events (E1, E2, E4 and E6) related to VRID-1 and respective weight factors (W1, W2, W4, and W6). A ceiling value Wmax is preset for VRID-1 in both ADCs.

Assuming E1 and E6 occur in the set of resources associated with ADC1, while E2 occurs in the set of resources associated with ADC2. Then based on the template 311, The ADC 1 health score is computed as Wmax−(W1+W6) at 312, and ADC 2 health score is computed as Wmax−W2 at 313. At 314, the health scores are compared. If the health scores are unequal, as determined at 315, a switchover decision is generated at 330 based on the health score comparison.

If a tie in the health scores is resulted at 315, the level 2 determination process is invoked at 321. The priority template for VRID has a single event E10. If E10 is detected for ADC1 but not detected in ADC2, then ADC2 has a higher priority score than the ADC1 as determined in 322. Then a switchover decision is generated at 330 based on the priority score comparison.

Table 1-4 show examples of using two-tier determination scheme to make failover decisions in accordance with an embodiment of the present disclosure. Here both levels have a preset ceiling value of 255, which will trigger failover once events occur, unless there is a tie. The total costs caused by tracked events can be compared. In these examples, cost refers to an aggregation of the assigned weight factors of the events that have occurred (i.e., higher cost implies lower priority).

Table 1 shows devices AX1 and AX2 are both configured for logic group VRID1. AX1 tracks two level-1 events: (event-id 1.1.1, priority cost 2) and (event-id 1.1.2, priority cost 1). AX1 also tracks two level-2 events: (event-id 1.2.1, priority cost 2) and (event-id 1.2.2, priority cost 1). Similarly, AX2 tracks 3 level-1 events and 3 level-2 events.

With the example defined in Table 1, assume that the original statuses of the two devices are AX1-Active and AX2-Standby. A tuple is used to denote whether level-1 and level-2 preemption are enabled (1) or disabled (0). For example, (1,1) denotes all enabled. (1,0) denotes level-1 enabled and level-2 disabled. The devices in the same cluster have the same preemption disable/enable setting. Table 2 shows the results in the scenario of AX1=(1,1) and AX2=(1, 1). Table 3 shows the results in the scenario of AX1=(1,0) and AX2=(1,0). Table 4 shows the results in the scenario of AX1(0,1) and AX2 (0, 1). Table 4 shows the results in the scenario of AX1(0,0) and AX2 (0, 0).

TABLE 1

| Device ID: logic gropu | Level-1 Events; Cost | Level-2 Events; Cost | Level-2 Priority |
|---|---|---|---|
| AX1: VRID 1 | Event 1.1.1; 2<br>Event 1.1.2; 1 | Event 1.2.1; 2<br>Event 1.2.2; 1 | 200 |
| AX2: VRID 1 | Event 2.1.1; 1<br>Event 2.1.2; 1<br>Event 2.1.3; 1 | Event 2.2.1; 1<br>Event 2.2.2; 1<br>Event 2.2.3; 1 | 200 |

TABLE 2

| AX1 Detected Events | AX1 Leve-1 Priority | AX1 Leve-2 Priority | AX2 Detected Events | AX2 Leve-1 Priority | AX2 Leve-2 Priority | Failover |
|---|---|---|---|---|---|---|
| 1.1.1 and/or any 1.2.X | 253 | 200-m | Any of 2.2.X | 255 | 200-n | Yes |
| 1.1.1 and/or any 1.2.X | 253 | 200-m | Any one of 2.1.X and/or any 2.2.X | 254 | 200-n | Yes |
| 1.1.1 and/or any 1.2.X | 253 | 200-m | Any two of 2.1.X and/or any 2 | 253 | 200-n | (200-m) > (200-n)? No: Yes |
| 1.1.1 and/or any 1.2.X | 253 | 200-m | 2.1.1-2.1.3 and/or any 1.2.X | 252 | 200-n | No |
| 1.1.1-2 and/or any 1.2.X | 252 | 200-m | Any two of 2.1.X and/or any 1.2.X | 253 | 200-n | Yes |
| 1.1.1-2 and/or any 1.2.X | 252 | 200-m | 2.1.1-2.1.3 and/or any 1.2.X | 252 | 200-n | (200-m) > (200-n)? No: Yes |

TABLE 3

| AX1 Detected Events | AX1 Leve-1 Priority | AX1 Leve-2 Priority | AX2 Detected Events | AX2 Leve-1 Priority | AX2 Leve-2 Priority | Failover |
|---|---|---|---|---|---|---|
| 1.1.1 and/or any 1.2.X | 253 | 200-m | Any of 2.2.X | 255 | 200-n | Yes |
| 1.1.1 and/or any 1.2.X | 253 | 200-m | Any one of 2.1.X and/or any 2.2.X | 254 | 200-n | Yes |
| 1.1.1 and/or any 1.2.X | 253 | 200-m | Any two of 2.1.X and/or any 2 | 253 | 200-n | No |
| 1.1.1 and/or any 1.2.X | 253 | 200-m | 2.1.1-2.1.3 and/or any 1.2.X | 252 | 200-n | No |
| 1.1.1-2 and/or any 1.2.X | 252 | 200-m | Any two of 2.1.X and/or any 1.2.X | 253 | 200-n | Yes |
| 1.1.1-2 and/or any 1.2.X | 252 | 200-m | 2.1.1-2.1.3 and/or any 1.2.X | 252 | 200-n | No |

TABLE 4

| AX1 Detected Events | AX1 Leve-1 Priority | AX1 Leve-2 Priority | AX2 Detected Events | AX2 Leve-1 Priority | AX2 Leve-2 Priority | Failover |
|---|---|---|---|---|---|---|
| 1.1.1 and/or any 1.2.X | 253 | 200-m | Any of 2.2.X | 255 | 200-n | (200-m) > (200-n)? No: Yes |
| 1.1.1 and/or any 1.2.X | 253 | 200-m | Any one of 2.1.X and/or any 2.2.X | 254 | 200-n | (200-m) > (200-n)? No: Yes |
| 1.1.1 and/or any 1.2.X | 253 | 200-m | Any two of 2.1.X and/or any 2 | 253 | 200-n | (200-m) > (200-n)? No: Yes |
| 1.1.1 and/or any 1.2.X | 253 | 200-m | 2.1.1-2.1.3 and/or any 1.2.X | 252 | 200-n | (200-n)? No: Yes |
| 1.1.1-2 and/or any 1.2.X | 252 | 200-m | Any two of 2.1.X and/or any 1.2.X | 253 | 200-n | (200-n)? No: Yes |
| 1.1.1-2 and/or any 1.2.X | 252 | 200-m | 2.1.1-2.1.3 and/or any 1.2.X | 252 | 200-n | (200-m) > (200-n)? No: Yes |

TABLE 5

```
On_Receive_VRRP_Hello_Message:
        If Preemption Check Failed
                log the error;
                increase VRRP packet error counter;
                drop packet;
                return;
        end
        for the group with the same VRID as the VRID received in the packet
        switch (local group state)
                case Active:
                        if (level-1 preemption enabled)
                                Determine state by level-1 priority;
                                if (tie && level-2 preemption is disabled)
                                        determine state based on device-id
                                        goto end-state;
                                end
                        else if((level-1 preemption disabled && level-2 preemption is enabled))
                                Determine state by level-2 priority and device-id
                        end
                        break;
                case Standby:
                        if (level-1 preemption enabled)
                                Determine state by level-1 priority;
                                if (tie && level-2 preemption is disabled)
                                        determine state based on device-id
                                        goto end-state;
                                end
                        else if((level-1 preemption disabled && level-2 preemption is enabled))
                                Determine state by level-2 priority and device-id
                        end
                        break;
                default:
                        log error
                        break;
        end_state:
                free_packet( );
        end of message receiving
```

Figure 4:
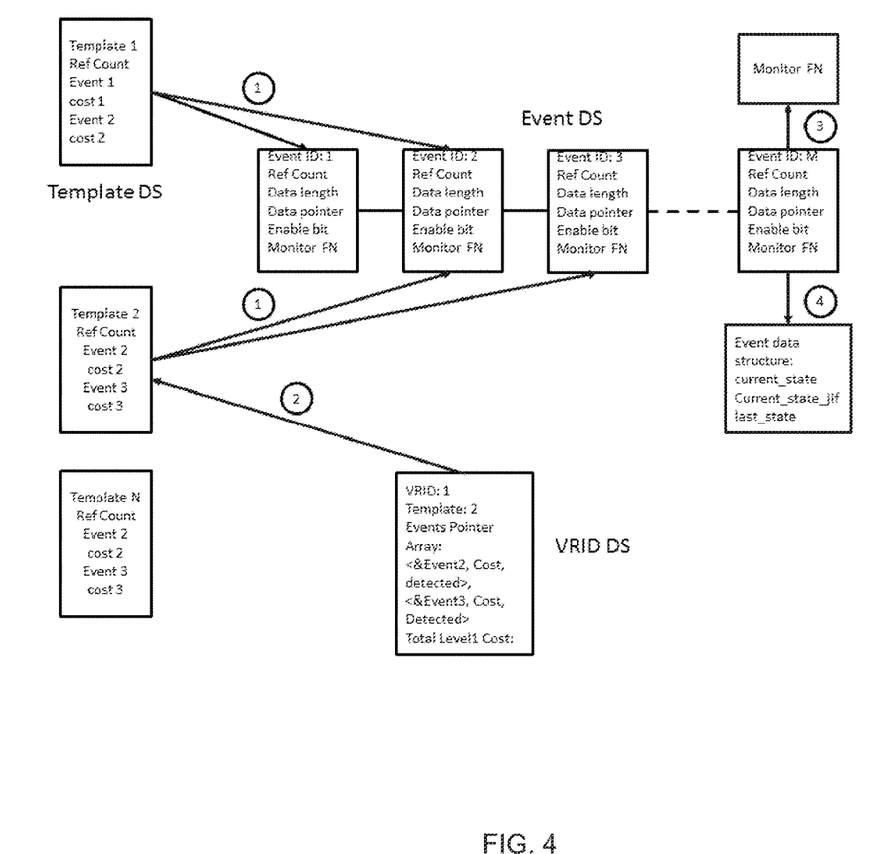
FIG. 4 shows an exemplary data structure design for a customized switchover template based on a customized user policy in accordance with an embodiment of the present disclosure.

FIG. 4 shows an exemplary data structure design for customized switchover template based on a user policy in accordance with an embodiment of the present disclosure. Three data structures (DS) are configured to support this feature: the Template DS, the event DS and the Virtual Router Identifier (VRID) DS.

The Template DS stores failover template configuration. There are several mandatory fields, such as reference counts, Virtual Network Partition (VNP) identifiers and tracking event information (e.g., event-id and event cost), and name. The templates are stored in a global array.

The Event DS is for actual event tracking function. A type length value (TLV)-style design is used to provide a flexible way of adding new tracking events. Specifically, fields of Event DS include: Event-ID, reference counts (e.g., number of VRIDs referring this event), enable bit, monitoring function pointer (a callback function for monitoring this event), data length and data type pointer (i.e., these two fields define the data that used for monitoring). For example, if an interface is tracked, a data structure defined for tracking interface is used. If a VLAN is tracked, another data structure defined for VLAN tracking is used. With this TLV-style design, new tracking events can be easily added. The Event DS can be stored in an array with the array index being the same as its event-id.

The VRID DS: To avoid overwhelming the VRRP group data structure, a new data structure is created for storing the failover events tracking information. Key fields include: enable-bit, event tracking information array, event identifiers, cost, and total cost.

The numbers in the circle show the relationship of three DSes. If a template is assigned to a VRID DS, it first enables the corresponding events defined in the template. Then, VRID assigns the template id to its template field and records the tracked events into its event array. For Event DS, the monitoring function and data are defined by feature developer.

An exemplary work workflow is as follows. During a template configuration process, a function receives template configuration and calls another function to set/reset/unset corresponding Template DS. The template can be removed only if its reference count is equal to 0.

Template can be assigned or removed for a VRID. Then, VRID DS initializes its tracking events field and Event DS enables the tracking Note that only if Event reference count is equal to 0, the event tracking can be disabled.

During event tracking, a control timer operates to periodically iterate over the events array to monitor the events based on monitoring function and data. In cost calculation, the control timer checks each VRID against all tracked events and calculates the total cost.

Figure 5:
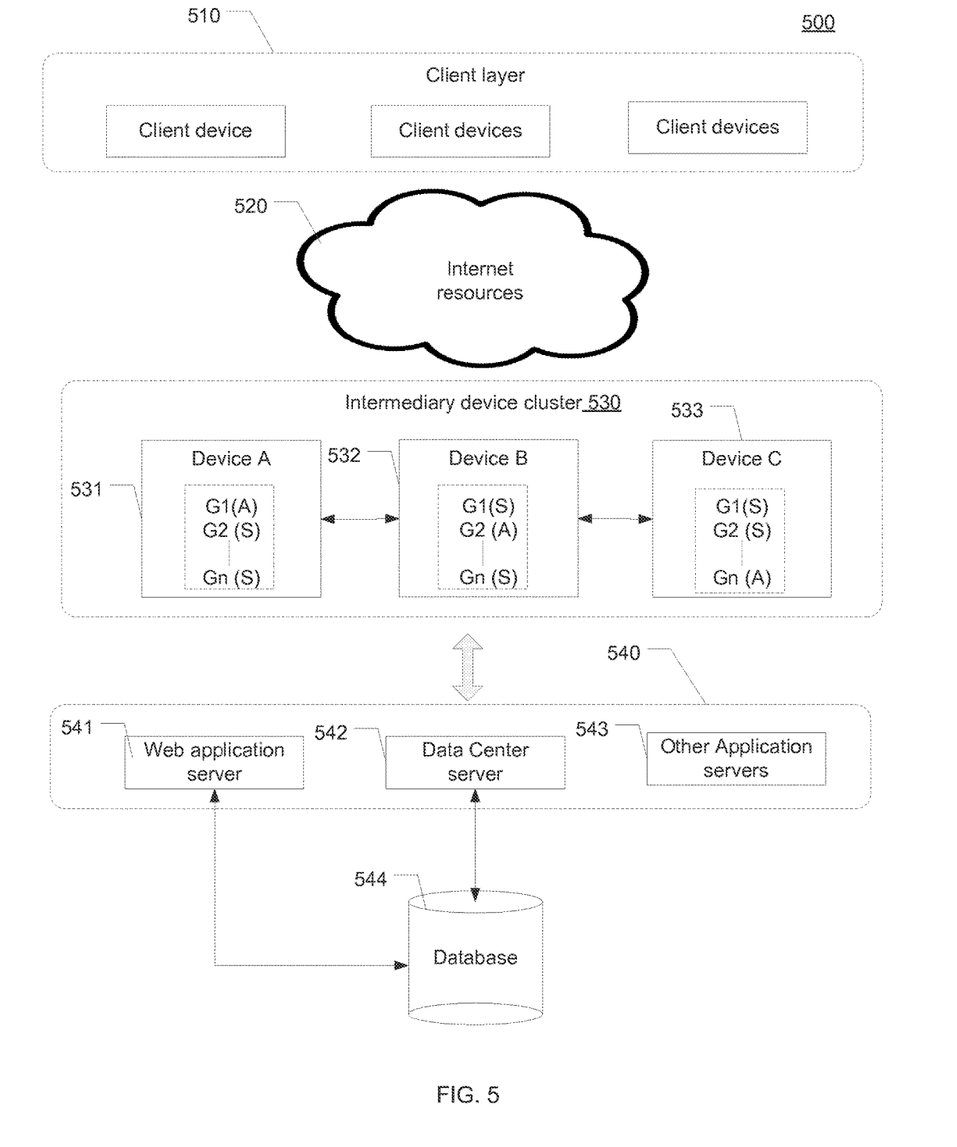
FIG. 5 illustrates an exemplary network system including a cluster of intermediate devices employing two-tier failover determination templates in accordance with an embodiment of the present disclosure for computing device health.

FIG. 5 illustrates an exemplary network system 500 including a cluster of intermediate devices 530 employing two-tier failover determination templates in accordance with an embodiment of the present disclosure. The network system further includes a client layer 510, the Internet resources 520 and a server layer 540.

The server layer 540 includes server devices, such as a web application server 541, a data center server 542 or other application servers 543 to provide Internet or online services to the client devices in 510. The data center server and the web application server may be coupled to a database 544. The intermediary device cluster 530 are configured to provide services defined by n logic groups, G1, . . . , Gn, and three devices 531-533. Each device has function engines corresponding to logic groups G1, G2, . . . , Gn. Each device is associated with a respective set of network resources in 520 with respect to each logic group. The operation status of each device regarding a logic group is determined using a customized template based on a user policy.

In some other embodiments, a customized template can be used to determine the active or standby status of devices with respect to a logic partition that includes multiple logic groups. Thus the logic groups in a logic partition have the same active or standby status. For example, partition A and B may provide the same set of service functions but to different user groups, organizations or entities. Alternatively, they may provide different sets of service optimization functions to the same or different user groups.

The operation statues of the devices A, B and C with respect to each logic group are determined by a two-tier determination process as described with reference to FIG. 4. As a result, device A 531 is currently active to provide the service defined in G1, device B 532 is currently active to provide the service defined in G2, and device C 533 is currently active to provide the service defined in Gn.

Although the devices 531-533 are logically equivalent with respect to G1, G2, . . . , Gn, the devices 531-533 may have different hardware implementations. In some other embodiments, the cluster may include ADCs, wide area network optimizer controllers, gateways, service control engines, or a combination thereof. Each device may have other functions uncommon to its peers in the cluster.

It will be appreciated that a network system may deploy multiple clusters of intermediary devices. For instance, besides a cluster of intermediary devices coupled to the server layer, another cluster of intermediary devices are coupled to the client layer.

Figure 6:
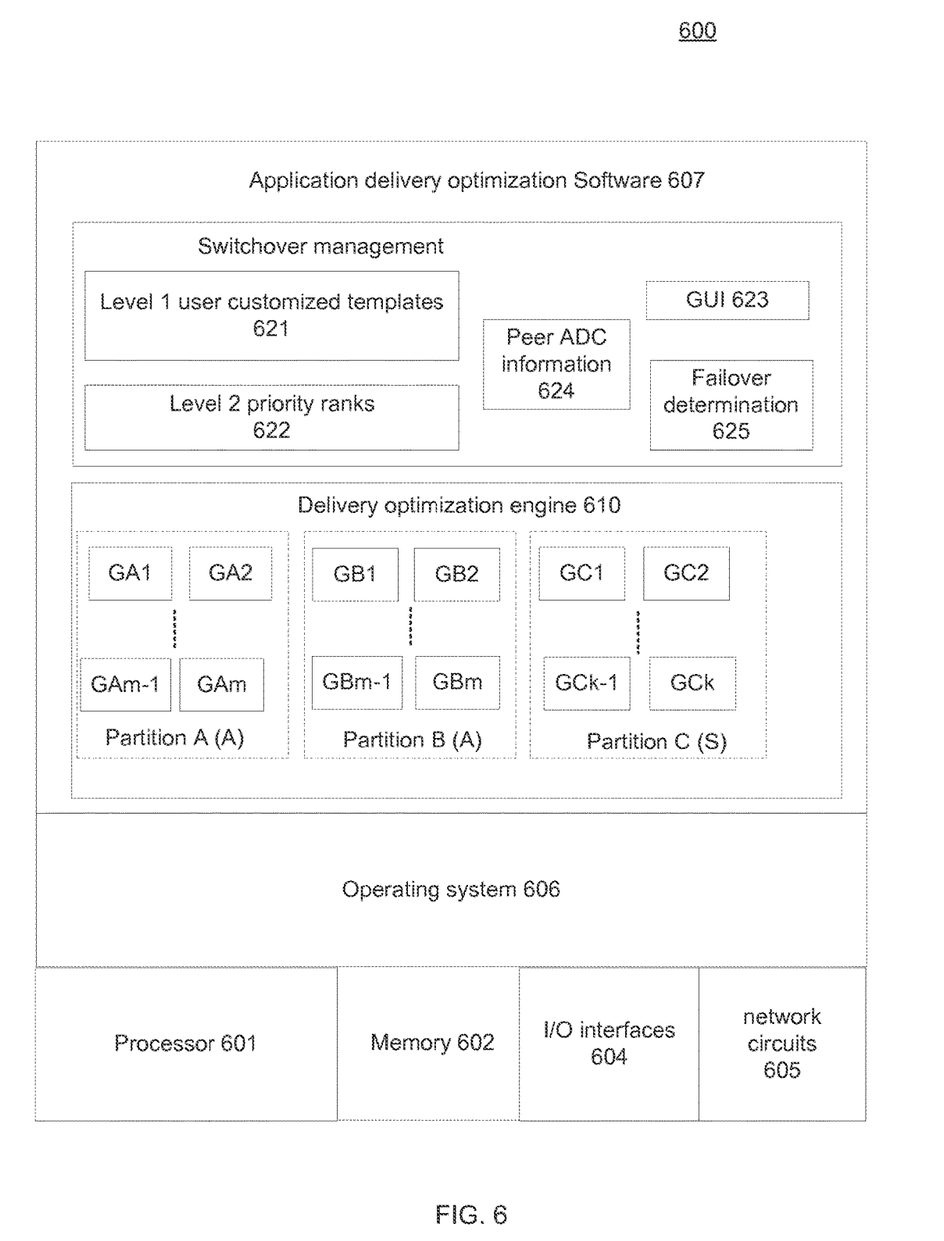
FIG. 6 is a block diagram illustrating an exemplary application delivery intermediary device including a switchover manager according to an embodiment of the present disclosure.

FIG. 6 is a block diagram illustrating an exemplary application delivery intermediary device 600 including a switchover manager according to an embodiment of the present disclosure. The intermediary device 600 comprises a processor 601, memory 602, a GPU 603, I/O interfaces 604, network circuits 605, an operating system 606 and application delivery optimization software 607 including the switchover manager 602 and the delivery optimization engines defined by logic groups, e.g., GA1, GB2, and GCk. The processor 601 may be any multi-core processor, e.g. Intel Xeon Quad-core or Hex-core processor, for instance.

The logic groups are designed to provide various delivery services to one or more service user groups as described in greater detail above. The logic groups are divided into partitions A, B and C.

Through the network circuits 605, the intermediary device is communicably coupled to one or more other intermediary devices (not shown) that each has the same logic groups and partitions. The switchover manager 620 is operable to determine the active/standby statuses of the logic groups/partitions in the intermediary device 600.

The switchover manager 620 includes level 1 health determination templates that are configured based on user policies and level 2 priority determination templates. The logic groups in each partition are associated with a single level-1 template and a single level 2 template. A GUI module 623 can render a GUI to receive user input for event selection, weight factor assignment, and others related to template configurations. The module 624 can store information on peer devices, e.g., health scores or the instant priority rank. The switchover determination module 625 can determine the health score and priority score of the instant device 600, compare the scores with peer devices, communicate the calculated scores with the peer devices, and determine an active/standby status for the instant device 600. The templates may be configured in compliance with a virtual router redundancy protocol (VRRP).

The switchover manager 620 may further include a script engine that can receive use configurations on level 1 and/or level 2 templates through scripts, e.g., in Perl scripts.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method for determining active/standby status for device resources:
   receiving user input specifying a first set of events and a policy related to said first set of events for computing numerical health scores for a first resource associated with a first device, and for a second resource associated with a second device, wherein said first and said second resources are configured to be functionally equivalent in an intermediary device cluster;
   compiling said first set of events and a policy into a template resident in said intermediary device cluster and accessible to said first device and said second device, wherein said policy specifies: a numerical health score for each event of said first set of events, and a weight value for each event of said first set of events;
   monitoring events with respect to said first device and said second device to determine if any of said first set of events defined in said template occurs;
   based on said monitoring, said template, and said user input, determining numerical health scores for said first resource and said second resource, wherein said numerical health scores are dynamically derived and updated by at least one of any occurrence of said first set of events or a periodic update, and said numerical health scores are communicated between the first and second device;
   accessing a priority rank that is determined based on a second set of events;
   monitoring said second set of events;
   determining a priority value for said first resource and a priority value for said second resource based on said monitoring said second set of events;
   responsive to a determination that said numerical heath score for said first resource is lower than said numerical health score for said second resource, switching from actively using said first resource to actively using said second resource in said intermediary device cluster and instructing said first resource to be standby;
   responsive to a determination that said numerical heath score for said first resource is equal to said numerical health score for said second resource, and said priority value for said first resource is lower than said priority value for said second resource, switching from actively using said first resource to actively using said second resource in said intermediary device cluster and instructing said first resource to be standby; and
   routing service requests to said second resource of said second device responsive to the switching.

2. The method as described in claim 1 wherein said first set of events comprise failover events and resource usage events.

3. The method as described in claim 2 wherein said first set of events comprise events selected from a group consisting of: a gateway disconnection, memory usage reaching a predetermined threshold, a virtual local area network (VLAN) traffic stop, an Ethernet data port failure, a firewall failure, a trunk failure, a link failure, a buffer location failure, and a selected route being unavailable in an associated data route table.

4. The method as described in claim 1 wherein said first device and said second device comprise application delivery controllers.

5. The method as described in claim 1 wherein said first device and second device are carrier gateway networking gateways.

6. The method as described in claim 1 wherein said user input comprises a script.

7. The method as described in claim 1, wherein first resource is configured to perform a function selected from a group consisting' of load balancing, caching, task offloading, accelerated compression, connection pooling, web application firewall, content transformation, transaction assurance, Secure Sockets Layer (SSL) offloading, Transmission Control Protocol (TCP) and Hypertext Transfer Protocol (HTTP) optimization, virtualization awareness, and address and protocol translation.

8. A non-transitory computer-readable storage medium embodying instructions that, when executed by a processing device, cause the processing device to perform a method of facilitating application delivery, said method comprising:
receiving user input that identifies a first set of events and a policy to said first set of events for computing numerical health scores for a first group of resources associated with a first device and for a second group of resources for a second device, wherein said second group have functionally equivalent logic with said first group with respect to an intermediary device cluster;
compiling said first set of events and a policy into a template resident in said intermediary device cluster, and accessible to said first device and said second device, wherein said policy specifies: a numerical health score for each event of said first set of events, and a weight value for each event of said first set of events;
monitoring said first set of events with respect to said first device and said second device to determine if any of said first set of events defined in said template occurs;
determining numerical health scores for said first group of resources and for said second group of resources based on said monitoring said first set of events, wherein said numerical health scores are dynamically derived and updated by at least one of any occurrence of said first set of events or a periodic update, and said numerical health scores are communicated between the first and second device;
accessing a priority rank that is determined based on a second set of events;
monitoring said second set of events;
determining a priority value for said first group of resources and a priority value for said second resource based on said monitoring said second set of events; and
switching from actively using said first group of resources to actively using said second group of resources in said intermediary device duster based on said numerical health score and said priority value, wherein the switching is responsive to a determination that said numerical heath score for said first resource is lower than said numerical health score for said second resource, or responsive to a determination that said numerical heath score for said first resource is equal to said numerical health score for said second resource, and said priority value for said first resource is lower than said priority value for said second resource; and
routing service requests responsive to the switching and instructing said first group of resources to be standby in said intermediary device cluster.

9. The non-transitory computer-readable storage medium as described in claim 8, wherein said numerical health score takes precedence over said priority value during said determining said status.

10. The non-transitory computer-readable storage medium as described in claim 8, wherein said first set of events are associated with respective weight factors specified by said user input, wherein said determining said numerical health scores further comprises subtracting weight factors of detected events from a preset numerical health score.

11. The non-transitory computer-readable storage medium as described in claim 8, wherein each of said first group of resources is configured to serve a respective user group.

12. The non-transitory computer-readable storage medium as described in claim 8, wherein said method further comprises determining a policy template in compliance with a Virtual Router Redundancy Protocol (VRRP).

13. The non-transitory computer-readable storage medium as described in claim 8, wherein said receiving comprises receiving user selections from a plurality of events through a graphical user interface.

14. The non-transitory computer-readable storage medium as described in claim 8, wherein said first set of events are pertinent to resource usage and/or errors of infrastructures selected from a group consisting of memory, a virtual local area network (VLAN), an Ethernet data port, a firewall failure, a trunk, a link, a buffer, a router, a firewall, and a processing unit.

15. An application delivery intermediary device comprising:
communication circuits;
a processor; and
memory coupled to said processor and comprising instructions that, when executed by said processor, cause the system to perform a method of facilitating application delivery between client devices and server devices with high reliability, said method comprising:
receiving user input identifying a first set of events and a policy related to said first set of events for computing numerical health scores for a first resource attached to a first device and a second resource attached to a second device, wherein said first resource and said second resource are configured to be functionally equivalent with respect to an intermediary device cluster;
compiling said first set of events and a policy into a template resident, in a device in said intermediary device cluster, and accessible to said first device and said second device, wherein said policy comprises a health value for each event of said first set of events, and a weight value for each event of said first set of events;
monitoring events with respect to said first device and said second device to determine if any of said first set of events defined in said template occurs;
based on said monitoring, said template, and said user input, determining a numerical health score for said first resource and said second resource, wherein said numerical health scores are dynamically derived and updated by at least one of any occurrence of said first set of events or a periodic update, and said numerical health scores are communicated between the first and second device;

accessing a priority rank that is determined based on a second set of events;

monitoring said second set of events;

determining a priority value for said first resource and a priority value for said second resource based on said monitoring said second set of events;

responsive to a determination that said numerical heath score for said first resource is lower than said numerical health score for said second resource, switching from actively using said first resource to actively using said second resource in said intermediary device cluster and instructing said first resource to be standby;

responsive to a determination that said numerical heath score for said first resource is equal to said numerical health score for said second resource, and said priority value for said first resource is lower than said priority value for said second resource, switching from actively using said first resource to actively using said second resource in said intermediary device cluster and instructing said first resource to be standby; and routing service requests to said second resource of said second device, responsive to said switching.

16. The application delivery intermediary device as described in claim 15, wherein said first device and said second device comprise application delivery controllers, and wherein further said first set of events comprise failover events and resource usage events.

* * * * *